(12) United States Patent
Noice et al.

(10) Patent No.: US 8,161,425 B1
(45) Date of Patent: Apr. 17, 2012

(54) METHOD AND SYSTEM FOR IMPLEMENTING TIMING AWARE METAL FILL

(75) Inventors: David Noice, Palo Alto, CA (US); Gary Nunn, Los Gatos, CA (US); Inhwan Seo, Fremont, CA (US); William Kao, Fremont, CA (US); Xiaopeng Dong, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1030 days.

(21) Appl. No.: 11/407,873

(22) Filed: Apr. 19, 2006

(51) Int. Cl.
*G06F 17/50* (2006.01)

(52) U.S. Cl. .............. 716/55; 716/51; 716/52; 716/53; 716/54; 716/56; 430/5; 430/30

(58) Field of Classification Search .............. 716/2, 4–6, 716/19–21, 50–56; 430/5, 30
See application file for complete search history.

(56) References Cited

U.S. PATENT DOCUMENTS

| | | | |
|---|---|---|---|
| 5,768,479 A | 6/1998 | Gadelkarim et al. | |
| 7,231,624 B2 | 6/2007 | Vuong et al. | |
| 7,260,803 B2 * | 8/2007 | Lakshmanan et al. | 716/10 |
| 7,287,324 B2 | 10/2007 | Vuong et al. | |
| 7,328,419 B2 | 2/2008 | Vuong et al. | |
| 7,404,173 B2 * | 7/2008 | Wu et al. | 716/19 |
| 7,574,685 B1 | 8/2009 | Dong et al. | |
| 7,661,078 B1 | 2/2010 | Noice et al. | |
| 7,802,219 B2 | 9/2010 | Tomar et al. | |
| 2003/0228714 A1 * | 12/2003 | Smith et al. | 438/8 |
| 2004/0098674 A1 * | 5/2004 | Vuong et al. | 716/1 |
| 2006/0117289 A1 * | 6/2006 | Katagiri | 716/13 |

OTHER PUBLICATIONS

"New Metal Fill Considerations for Nanometer Technologies", Xiaopeng Dong, Inhwan Seo, and William Kao, IEEE @2005.*

* cited by examiner

*Primary Examiner* — Thuan Do
*Assistant Examiner* — Nha Nguyen
(74) *Attorney, Agent, or Firm* — Vista IP Law Group, LLP

(57) ABSTRACT

An improved approach for implementing metal fill on an electrical device without causing creating cross-coupling capacitance problems is disclosed. Timing aware metal fill insertion is performed to avoid or minimize cross-capacitance problems on the IC design. A cost may be assigned to different candidate metal fill shapes. The cost is associated with the expected effect upon timing requirements by the metal fill shape, with lower costs corresponding to lower expected impacts upon the timing requirements. To meet density requirements, lower cost metal fill shapes are inserted prior to higher cost metal fill shapes.

54 Claims, 17 Drawing Sheets

| Candidate | Cost |
|---|---|
| 416 | 0 |
| 418 | 0 |
| 420 | 0 |
| 414 | 7 |
| 422 | 8 |
| 424 | 20 |
| 426 | 23 |
| 410 | 35 |
| 412 | 40 |

Fig. 7C

Candidate Metal Fill Shapes
| Candidate | Cost |
|---|---|
| 416 | 0 |
| 418 | 0 |
| 420 | 0 |
| 414 | 7 |
| 422 | 8 |
| 424 | 20 |
| 426 | 23 |
| 410 | 35 |
| 412 | 40 |
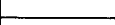
Metal Fill Shapes Inserted in Design
| Insert | Density |
|---|---|
| 416 | 30% |
Density Requirement is 40%:
Is Density => 40% ?
NO -- Insert Additional Metal Fill
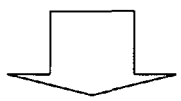
Go to Fig. 7E to insert additional metal fill Candidate Metal Fill Shapes

| Candidate | Cost |
|---|---|
| 4̶1̶6̶ | 0̶ |
| 418 | 0 |
| 420 | 0 |
| 414 | 7 |
| 422 | 8 |
| 424 | 20 |
| 426 | 23 |
| 410 | 35 |
| 412 | 40 |

Metal Fill Shapes Inserted in Design

| Insert | Density |
|---|---|
| 416 | 30% |
| 418 | 32% |

Density Requirement is 40%:

Is Density => 40% ?

NO -- Insert Additional Metal Fill

Go to Fig. 7F to insert additional metal fill

Candidate Metal Fill Shapes

| Candidate | Cost |
|---|---|
| ~~416~~ | ~~0~~ |
| ~~418~~ | ~~0~~ |
| 420 | 0 |
| 414 | 7 |
| 422 | 8 |
| 424 | 20 |
| 426 | 23 |
| 410 | 35 |
| 412 | 40 |

Metal Fill Shapes Inserted in Design

| Insert | Density |
|---|---|
| 416 | 30% |
| 418 | 32% |
| 420 | 34% |

Density Requirement is 40%:

Is Density => 40% ?

NO -- Insert Additional Metal Fill

Go to Fig. 7G to insert additional metal fill

Candidate Metal Fill Shapes

| Candidate | Cost |
|---|---|
| ~~416~~ | ~~0~~ |
| ~~418~~ | ~~0~~ |
| ~~420~~ | ~~0~~ |
| 414 | 7 |
| 422 | 8 |
| 424 | 20 |
| 426 | 23 |
| 410 | 35 |
| 412 | 40 |

Metal Fill Shapes Inserted in Design

| Insert | Density |
|---|---|
| 416 | 30% |
| 418 | 32% |
| 420 | 34% |
| 414 | 36% |

Density Requirement is 40%:

Is Density => 40% ?

NO -- Insert Additional Metal Fill

Go to Fig. 7H to insert additional metal fill

Candidate Metal Fill Shapes

| Candidate | Cost |
|---|---|
| ~~416~~ | ~~0~~ |
| ~~418~~ | ~~0~~ |
| ~~420~~ | ~~0~~ |
| ~~414~~ | ~~7~~ |
| 422 | 8 |
| 424 | 20 |
| 426 | 23 |
| 410 | 35 |
| 412 | 40 |

Metal Fill Shapes Inserted in Design

| Insert | Density |
|---|---|
| 416 | 30% |
| 418 | 32% |
| 420 | 34% |
| 414 | 36% |
| 422 | 38% |

Density Requirement is 40%:

Is Density => 40% ?

NO -- Insert Additional Metal Fill

Go to Fig. 7I to insert additional metal fill

Candidate Metal Fill Shapes

| Candidate | Cost |
|---|---|
| ~~416~~ | ~~0~~ |
| ~~418~~ | ~~0~~ |
| ~~420~~ | ~~0~~ |
| ~~414~~ | ~~7~~ |
| ~~422~~ | ~~8~~ |
| 424 | 20 |
| 426 | 23 |
| 410 | 35 |
| 412 | 40 |

Metal Fill Shapes Inserted in Design

| Insert | Density |
|---|---|
| 416 | 30% |
| 418 | 32% |
| 420 | 34% |
| 414 | 36% |
| 422 | 38% |
| 424 | 40% |

Density Requirement is 40%:

Is Density => 40% ?

YES -- Stop Inserting Metal Fill

METHOD AND SYSTEM FOR IMPLEMENTING TIMING AWARE METAL FILL

BACKGROUND AND SUMMARY

The invention relates to the design and manufacture of integrated circuits, and more particularly, to techniques, systems, and methods for implementing metal-fill on an integrated circuit.

In recent years, in integrated circuit (IC) manufacturing, chemical-mechanical polishing (CMP) has emerged as an important technique for planarizing dielectrics because of its effectiveness in reducing local step height and achieving a measure of global planarization not normally possible with spin-on and resist etch back techniques. However, CMP processes have been hampered by layout pattern dependent variation in the inter-level dielectric (ILD) thickness which can reduce yield and impact circuit performance.

Metal-fill patterning is a common approach for reducing layout pattern dependent dielectric thickness variation. Metal-fill patterning is the process of filling large open areas on each metal layer with a metal pattern to compensate for pattern-driven variations. The manufacturer of the chip normally specifies a minimum and maximum range of metal that should be present at each portion of the die. If there is an insufficient amount of metal at a particular portion on the chip, then metal-fill is used to increase the proportion of metal in that portion. However, too much metal may cause dishing to occur. Therefore, the metal-fill process should not cause the die to exceed any specified maximum range of metal for the chip.

The addition of the metal fill may negatively affect the electrical performance of the integrated circuit device. In particular, placement of metal fill shapes near existing features on the IC may cause cross coupling capacitances to occur on the device. As timing closure is a critical goal in the design of high speed devices, additional cross coupling capacitances can cause additional iterations in the design process due to slowing down some signals.

One solution to address the problem is to insert fewer metal fill geometries, which would result in less cross coupling capacitance. This approach causes a wider variation in the metal density percentage in the windows across the device as some areas already meet the user's preferred target density without adding any metal fill shapes at all. The problem with that lack of consistency is that there will be more OCV (On Chip Variation) issues as the wiring in higher density areas will become thinner than in the lower density areas. This difference in thickness is very difficult to account for.

Another solution is to place metal fill farther away from existing objects in the layout. A metal fill tool may use spacing rules when inserting metal fill, which mandate that metal fill cannot be inserted within a specified distance around existing shapes. These rules are uniformly applied for all shapes in the design. In an attempt to avoid harmful capacitance effects, organizations may increase the mandated spacing distance so that the actual spacing distance between metal fill and existing shapes exceeds what is required by the spacing rules. For instance, if the spacing rules require a distance of x, then organizations may actually use a spacing distance of 2x to avoid timing problems. The problem is that this approach of trying to put extra space around every object will significantly restrict the free space available to place metal fill, thereby preventing metal fill tools from hitting density targets for the fill.

Therefore, there is a need for an improved approach for implementing metal fill on an electrical device without causing creating cross-coupling capacitance problems. In some embodiments of the invention, timing aware metal fill insertion is performed to avoid or minimize cross-capacitance problems on the IC design. A cost may be assigned to different candidate metal fill shapes. The cost is associated with the expected effect upon timing requirements by the metal fill shape, with lower costs corresponding to lower expected impacts upon the timing requirements. To meet density requirements, lower cost metal fill shapes are inserted prior to higher cost metal fill shapes.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The accompanying drawings are included to provide a further understanding of the invention and, together with the Detailed Description, serve to explain the principles of the invention.

FIGS. 7A-J illustrate an application of an embodiment of the invention to a portion of an IC design.

DETAILED DESCRIPTION

Disclosed is an improved method and system for implementing metal fill for an integrated circuit design which is capable of achieving the preferred density levels while minimizing cross coupling capacitance, effects.

Figure 1:
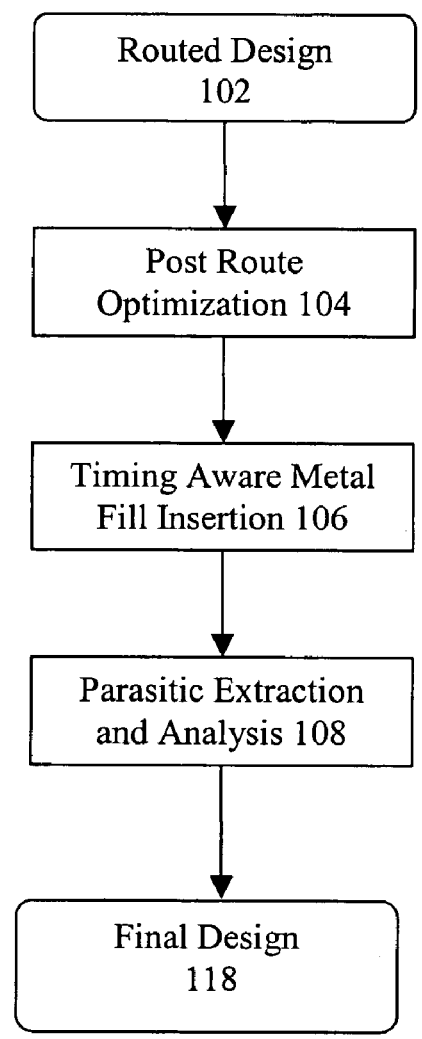
FIG. 1 shows a flow diagram of a process for implementing metal fill according to some embodiments of the invention.

FIG. 1 shows a process for implementing metal fill according to some embodiments of the invention. The use of this invention will increase the likelihood that the required timing for the device will be met in one pass, preventing the extra iteration(s) of metal fill insertion.

At 102, the IC design is placed and routed to generate a routed design. Any suitable approach can be taken to place and route the IC design. At 104, post route optimization is performed against the design. For example, compaction techniques may be used to optimize the layout of the IC design.

At 106, a one pass approach is taken to perform timing aware metal fill insertion into the layout. The one-pass approach permits metal fill to be inserted into the IC design in a manner that minimizes negative timing impact upon the design. In the present approach, the inventive system and method intelligently inserts metal fill into an IC design by taking into account the characteristics and nature of existing objects in the layout. Not all objects in a layout are affected in exactly the same way by nearby metal fill. This is particularly true with respect to the effects of cross-coupling capacitances and timing. For example, metal fill placed near power or ground objects will have less impacts upon timing than metal fill placed near objects that are associated with signal nets. In addition, the criticality of a net can be considered. For example, metal fill placed a given distance away from a critical signal net may have a greater impact upon timing compared to metal fill placed the same distance away from a non-critical signal net.

In the present invention, metal fill objects are inserted into the design in a timing aware manner, so that metal fill geometries having the least negative effects upon the IC will be inserted first, while metal fill geometries having greater negative effects are inserted only if necessary.

Once the metal fill objects have been sufficiently inserted to meet density requirements, parasitic extraction and analysis is performed at 108 to ensure that the inserted metal fill have not caused the IC design to fail timing requirements. After this verification has occurred, the final IC design is generated at 118.

Figure 2:
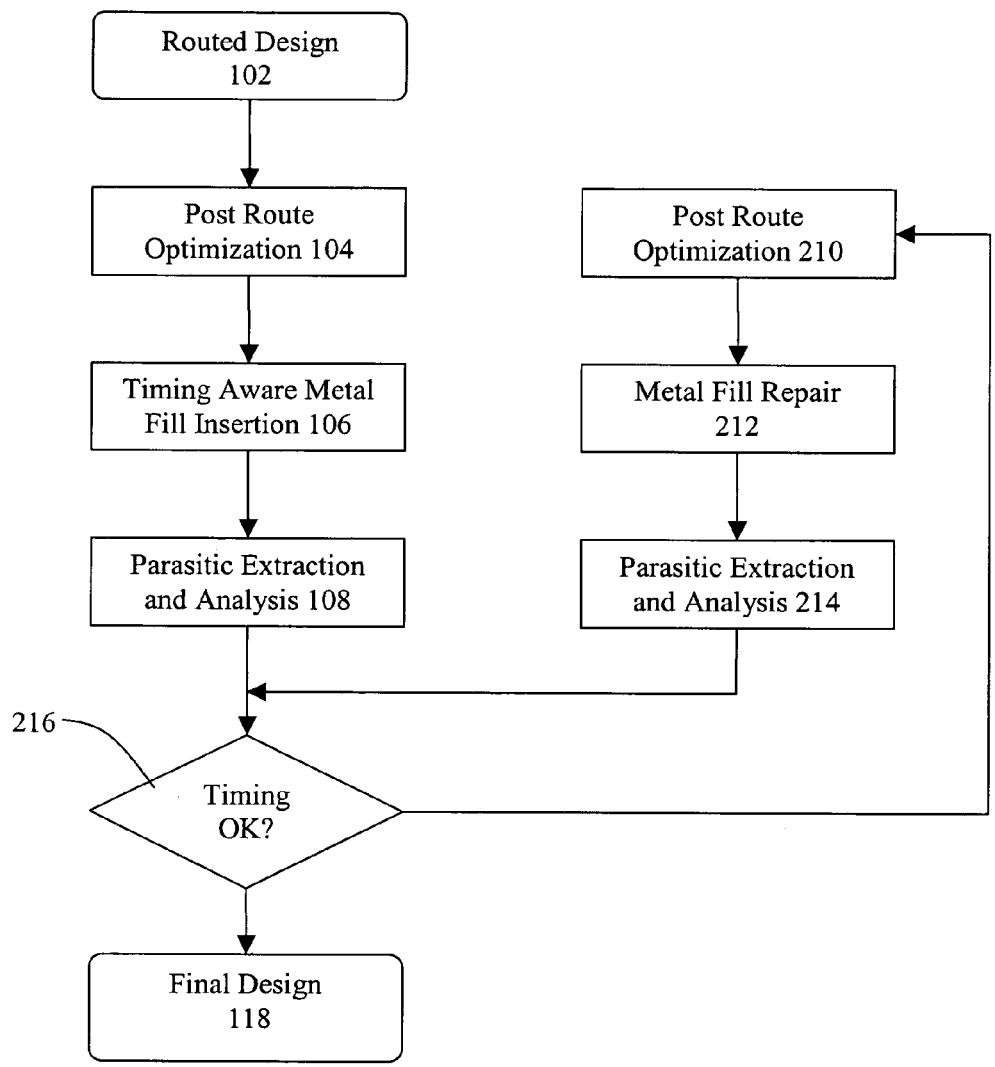
FIG. 2 shows a flow diagram of an alternate process for implementing metal fill according to some embodiments of the invention.

FIG. 2 shows a modified version of FIG. 1 in which metal fill repair may be performed. In this modified process, the IC design is placed and routed at 102, optimized at 104, and undergoes timing aware metal fill insertion at 106 as previously described relative to FIG. 1. However, if the parasitic extraction and analysis action at 108 detects a timing problem at 216, metal fill repair may be performed to correct the timing problem. For example, an ECO change process may be initiated to correct the timing problem.

At 210, ECO placement, routing actions, and optimization are performed. Placement action involves incremental placement of added instances of cells in the design while ignoring the existence of the metal fill geometries. Routing action involves incremental routing of the added and modified nets in the design while also ignoring the existence of the metal fill geometries. It is noted that these actions are performed by ignoring any design errors or rule violations that may be caused by the existing metal fill geometries. Optimization is also performed while ignoring existing metal fill objects.

Next, the process performs metal fill repairs at 212, if any are necessary, to correct design violations and errors that may have resulted from the placement, routing, and optimization actions of 210. Incremental repairs are performed, for example, to correct shorts and DRC violations, such as by trimming away or removing existing metal fill geometries that cause the short or DRC violation. In addition, in portions of the layout where original signal geometries were removed due to deletions in the ECO process, dummy metal fill can be added to get those areas back to the desired metal density, e.g., for portions of the design in which signal routing has been removed.

At 214, parasitic extraction and analysis may be performed to check the suitability of the layout and metal fill changes caused by the ECO and metal fill repair actions. The process returns back to 216 to determine if timing problems still exist. If so, then, the process may proceed back to 210 repeat the process actions again. Otherwise, the process can generate the final design 118. Further information regarding an exemplary ECO process that may be utilized in conjunction with the present invention are described in co-pending U.S. application Ser. No. 11/069,759, filed on Feb. 28, 2005, entitled "Method and System for Implementing Metal Fill," which is hereby incorporated by reference in its entirety. In some embodiments, the iteration of 210, 212, and 214 are not required in the flow, e.g., since parasitics are unaffected in areas of the design that the ECO did not change.

Figure 3:
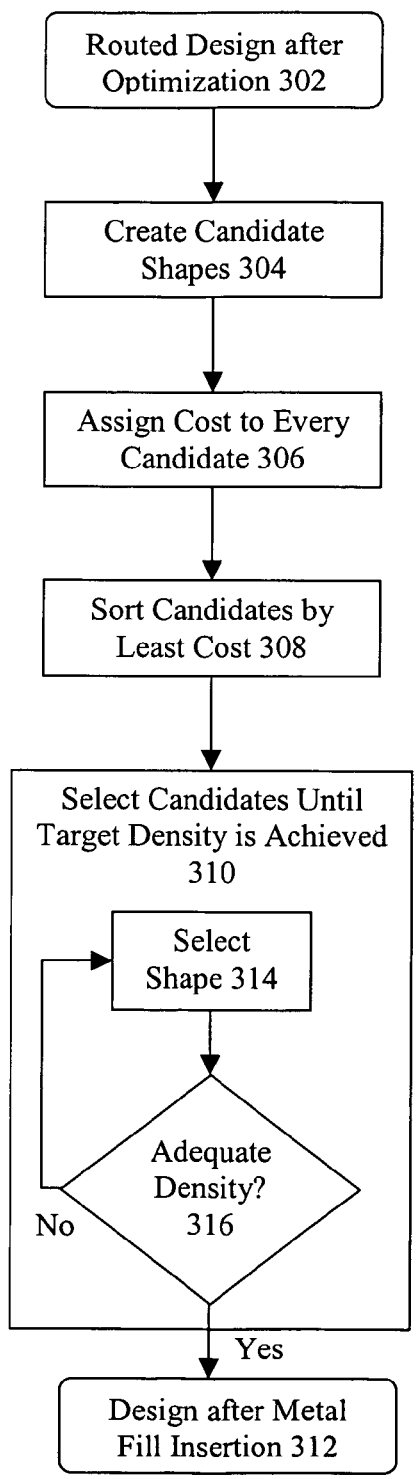
FIG. 3 shows a flow diagram of a process for implementing timing aware metal fill insertion according to some embodiments of the invention.

FIG. 3 shows a process for inserting metal fill in a timing aware manner. At 302, the IC design is placed, routed, and optimized to generate an optimized routed design. Any suitable approach or routing tool can be taken to place, route, and optimize the IC design. At 304, a set of candidate metal fill shapes is identified. Further information regarding an exemplary approach for identifying candidate metal fill shapes is described in co-pending U.S. application Ser. No. 10/300,722, filed on Nov. 19, 2002, entitled "METHOD, SYSTEM AND ARTICLE OF MANUFACTURE FOR IMPLEMENTING METAL-FILL ON AN INTEGRATED CIRCUIT," which is hereby incorporated by reference in its entirety.

A cost is assigned to each of the identified candidate metal fill shapes at 306. Weighting factors based upon various parameters associated with geometries, nearby object types, and configurations of the IC design are used to provide a cost for each metal fill shape. The weighting factors may be based upon intra-layer considerations, inter-layer considerations, or a mixture of both inter-layer and intra-layer considerations. Such weighting factors may include, for example, the following factors:

Intra-layer Proximity of a signal wire shape (closer distance is higher cost);

Inter-layer crossovers (area of intersection, with greater intersection area having higher cost); and Relative criticality of that signal wire shape (clocks and critical nets are higher cost than non-critical nets and power/ground nets).

The identification of critical nets can be obtained from timing analysis results, with a slack threshold used to determine the breakpoint between critical and non-critical nets.

The weighting factors for each candidate metal fill shape will determine the timing cost if that metal fill shape is inserted into the IC design. The candidate metal fill shapes are then sorted based upon timing costs at 308. In some embodiments, the candidate metal fill shapes are sorted from the lowest cost shapes to the highest cost shapes.

The candidate metal fill objects are selected for insertion into the IC design at 310 until the required fill density has been met. This action is performed in some embodiments by selecting candidate metal fill objects in order from lowest cost objects to the higher cost objects at 314. After each candidate metal fill shape is selected and inserted, a determination is made at 316 whether the density of the design meets minimum density requirements. If the density requirements are not met, then the process returns back to 314 to select another metal fill shape for insertion. Metal fill objects are inserted until the target density has been reached.

If the density requirements are met without incurring a timing problem, then the process is a one-pass process for implementing metal fill as described in FIG. 1, e.g., by only requiring insertion of low timing cost metal fill shapes. If enough high-cost metal fill shapes are inserted, then the process of FIG. 2 may be employed to correct timing problems.

In some embodiment, it is the relative timing costs that are tracked when inserting metal fill into the design. In this approach, the candidate metal fill shapes are sorted in cost order, a previously described. The lowest cost metal fill shapes are selected in order until the required density has been met, without immediate regard for the specific costs of each individual metal fill shape. It is after the required density has been met that an analysis is made regarding whether the selected metal fill shapes will excessively affect timing requirements of the design. If so, then an ECO process can be performed to correct the timing problems.

In some alternate embodiments, specific timing costs can be tracked for some or all of the metal fill shapes. In this approach, each metal fill shape is associated with a timing cost. As the candidate metal fill shapes are selected for insertion, the system tracks the increasing timing costs as more and more metal fill shapes are inserted. Timing cost thresholds may be established for the design. As metal fill shapes are inserted, the overall timing costs are checked against the timing cost thresholds. If the timing costs exceeds the allowable threshold, then corrective action is taken, e.g., by changing the set of candidate metal fill shapes. This action may be taken even if the required density has not yet been reached. In addition, the timing costs can be used in some embodiments to calculate, predict, model, or simulate the behavior of the design.

Several types of input data may be employed to determine the expected timing cost of a candidate metal fill shape. Some embodiments use the following types of information: (a) foundry specific parameters; (b) timing analysis information; (c) user defined parameters; and (d) layout extraction information.

The foundry specific information pertains to information from specific fabrication facilities in which the IC design will be fabricated. Such information includes, for example, the following information:
  Inter layer thickness
  Sheet capacitance/resistance
  Layer thickness
  Layer cost
  Net weight
This information is used to establish the cost of given candidate metal fill shape. In addition, this information can be used for parasitic extraction delay calculation to effect timing analysis. The information can also be used to help determine which nets are critical and non-critical.

Timing analysis may be performed to identify information relating to the timing of specific nets within the IC design. For example, the following timing analysis information may be used in the present process:
  Critical Net/Path order
  Critical Net/Path name
  Timing Slack
The user may have control over the dividing point for criticality of a net. For example, a particular timing value may be selected by a user. Any nets that are negative to that timing value are considered to be critical. Any nets that are positive relative to the selected timing value are not considered to be critical. A timing analysis report will include the information specified above for the timing of nets in the IC design.

The user defined parameters provide information from the user relating to the criticality of nets. In some embodiments, the user defined parameters include, for example, the following information:
  User defined critical net/path names
  User defined layer cost
  User defined Net weight
Using these parameters, the user could directly provide an identification of the critical and non-critical nets. This approach may be used, for example, with a metal fill tool that is a separate tool from a place and route tool. In this approach, a file may be received with a list of critical and non-critical nets.

In another approach, the metal fill tool is integrated with a place and route tool. Therefore, the timing analysis may be directly performed upon the data for routes that are located in memory. In this approach, a threshold is established for criticality of nets. The routing data is pulled from memory by using a slack threshold to look through a list and then categorize the nets. From a timing perspective, one or more timing graphs are analyzed and all nets less than the threshold are classified as critical and all nets below the threshold are identified ad non-critical. The foundry specific information can be used to feed the timing analysis engine to determine which nets are critical and which are not.

The layout extraction data provides information, for example, regarding the extracted metal fill candidates.

Cost calculations are performed to determine a timing cost value for each candidate metal fill shape. According to some embodiments, the cost is based upon the sum of the intralayer costs and the sum of the interlayer costs:

$$\text{Cost} = \Sigma C_{intraLayer} + \Sigma C_{interLayer}$$

The intralayer costs may be calculated as follows in some embodiments:

$$C_{intraLayer} = C_{parallel} * C_{netWeight} * C_{distance} + C_{sidewall}$$

$C_{parallel}$ = f(geometry, Foundry factor, user input)
$C_{netWeight}$ = f (TA report, Foundry factor, user input)
$C_{distance}$ = f (geometry, Foundry factor, user input)
$C_{sidewall}$ = f (geometry, Foundry factor, user input)

The intralayer costs is based upon geometries and parameters within the same layer as the metal fill shapes under examination.

The parallel factor relates to the parallel length of the metal fill relative to an existing geometry in the layout. In effect, a weighting is applied such that a longer piece of metal fill will typically have a higher cost than a shorter piece of metal fill.

The net weight factor relates to the relative impact for timing purposes of the category of a nearby shape. This factor can also be used to identify a weight based upon the specific type of nearby shape. For example, if the nearby shape is a power/ground net, then the weight could be a very small number or even zero. In other words, even if the metal fill shape has a very long parallel run to the nearby shape, if the net weight factor is zero (e.g., because it is a non-critical and/or power/ground object), then there may still no cost associated with that metal fill shape. In some embodiments, there are four groups of objects, with power/ground objects having zero weighting, signal nets with a relatively low cost factor, critical nets with a high cost factor, and clock nets with a very high cost factor.

The distance factor is the weighting associated with the distance between the metal fill and the shape in question. The farther an object is from the metal fill shape, the lower the timing cost associated with that shape. The closer the distance, the higher is the timing cost factor.

The sidewall is a capacitance calculation factor based upon sidewall effects to nearby shapes. The sidewall factor determine the capacitance not just along a parallel run, but also the effects around a fringe from a parallel side.

Figure 4:
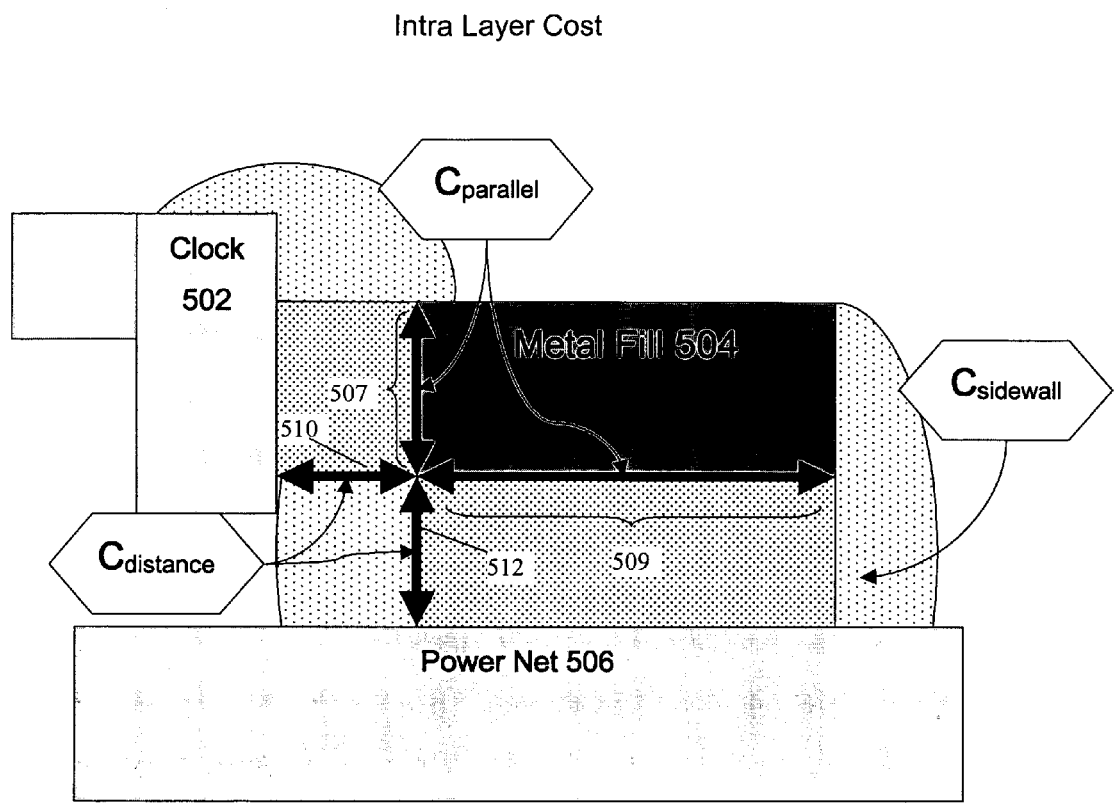
FIG. 4 illustrate cost and weighting factors for intralayer costs according to some embodiments of the invention.

FIG. 4 illustrates these weighting factors on an example layout. The example layout includes a metal fill shape 504, a clock net object 502, and a power net object 506. The $C_{parallel}$ factor is based upon the run length parallel to the adjacent shapes. Thus, $C_{parallel}$ is based upon the parallel run length 507 adjacent between the clock object 502 and the metal fill shape 504 as well as the parallel run length 509 adjacent between the power net object 506 and the metal fill shape 504.

The $C_{distance}$ factor is based upon the distance between the metal fill shape 504 and adjacent geometries. Thus, $C_{distance}$ is based upon the distance 510 between the clock object 502 and the metal fill shape 504 as well as the distance 512 between the power net object 506 and the metal fill shape 504.

The $C_{sidewall}$ factor is based upon the sidewall effects between the metal fill shape 504 and adjacent geometries. Thus, $C_{sidewall}$ is based upon the sidewall effects between the clock object 502 and the metal fill shape 504 as well as the sidewall effects between the power net object 506 and the metal fill shape 504.

The $C_{netweight}$ factor is based the type of type of objects that are adjacent to the metal fill shape 504. Chart 520 identifies example weighting factors that may be used for $C_{netweight}$ in some embodiments of the invention. As shown, the $C_{netweight}$ weight factor for power/round nets is zero. The $C_{netweight}$ weight factor for signal nets is 1, the $C_{netweight}$ weight factor for critical nets is 5, and the $C_{netweight}$ weight factor for clock nets is 10.

Figure 5:
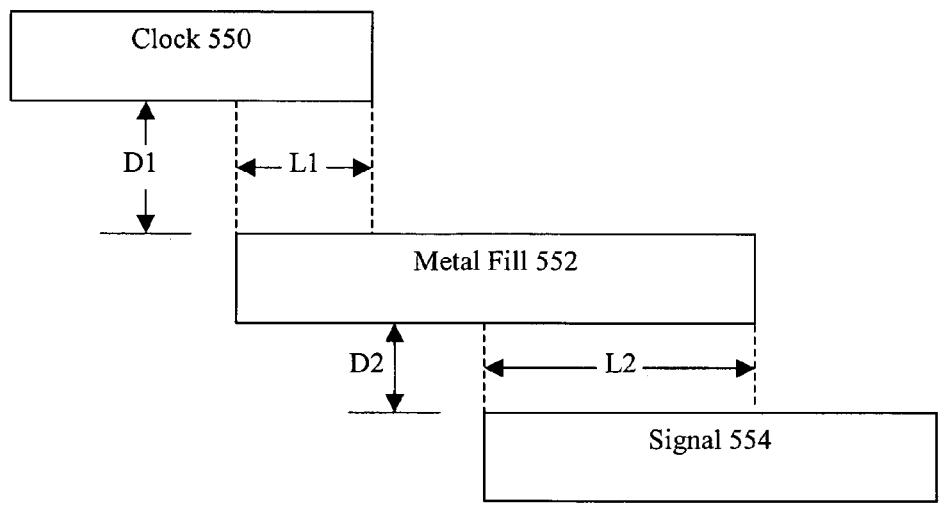
FIG. 5 provides an illustrative embodiment of a cost calculation for intralayer costs according to some embodiments of the invention.

FIG. 5 illustrates the calculation of a cost value for metal fill shapes. In this example, approximation is used to assign weights to the shapes. The goal of using an approximation is to make the calculation fast, but still produce a correct ordering of the candidate metal fill shapes. There may be a trade-off in the type of calculations used for the approximation and the absolute accuracy of the cost values, since in some approaches, the more accurate the calculations the longer it takes to perform the calculations.

In the embodiment shown in this illustrative example, the total intra-layer cost value for the metal fill shape is the sum of the cost values between the metal fill shape and each nearby and/or adjacent object. Therefore, the cost value for a metal fill shape is calculated as follows:

$$Cost_{total} = Cost_{nearby\_object\_1} + Cost_{nearby\_object\_2} + \cdots + Cost_{nearby\_object\_n}$$

The cost value for each nearby object is calculated, in one embodiment, based upon the following:

$$Cost_{nearby\_object} = Weight_{ObjectType} * 1/Distance * Length$$

The value is based upon the selected weight for each type of nearby object that is being analyzed. Examples of such weight values can be found, for example, in chart 520 of FIG. 4. The Distance value is the distance between the metal fill shape and the nearby object being analyzed. The Length value is based upon the length for which the metal fill shape runs parallel to the nearby object. In some embodiments, greater or less emphasis can be placed upon each of these values depending upon the desired goals of the designer, e.g., the emphasis of the distance value can be altered by changing the weighting of the distance value, for example, by using either $1/D$ or $1/D^2$ or $1/D^3$, etc.

In this illustrative example of FIG. 5, a metal fill shape 552 is adjacent or nearby to only two shapes: a clock net shape 550 and a signal net shape 554. The total cost value for the metal fill shape 552 is the sum of the cost value for the clock net shape 550 and the cost value for the signal net shape 554 as follows:

$$Cost_{MF\_552} = Cost_{Clock} + Cost_{Signal}$$

Assume that the distance between the clock net shape 550 and the metal fill shape 552 is D1. Further assume that the parallel run length shared between the two shapes is L1. From the chart 520 of FIG. 4, it can be seen that the $Weight_{ObjectType}$ for a clock net shape is "10". Based upon these parameters, the cost component of the clock net shape 550 added to the overall cost value of the metal fill 552 is:

$$Cost_{Clock} = 10 * 1/D1 * L1$$

Further assume that the distance between the signal net shape 554 and the metal fill shape 552 is D2. Further assume that the parallel run length shared between the two shapes is L2. From the chart 520 of FIG. 4, it can be seen that the $Weight_{ObjectType}$ for a signal net shape is "1". Based upon these parameters, the cost component of the signal net shape 554 added to the overall cost value of the metal fill 552 is:

$$Cost_{signal} = 1 * 1/D2 * L2$$

Therefore, the overall cost value for the metal fill shape 552 in this example is:

$$Cost_{MF\_552} = (10 * 1/D1 * L1) + (1 * 1/D2 * L2)$$

A similar set of calculations may be performed for each candidate metal fill shape for the design. In some embodiment, only adjacent shapes are considered when performing these calculations. In alternate embodiments, a threshold distance is established, wherein all nearby objects within the threshold distance is considered when performing these calculations.

The interlayer costs may be calculated as follows in some embodiments:

$$C_{interLayer} = C_{overlap} * C_{ILT} * C_{layer} + C_{sidewall}$$

$C_{overlap}$ = f (geometry, Foundry factor, user input)
$C_{ILT}$ = f (geometry, Foundry factor, user input)
$C_{layer}$ = f (geometry, Foundry factor, user input)
$C_{sidewall}$ = f (geometry, Foundry factor, user input)

The interlayer cost is based upon geometries and parameters relating to layer(s) above and below the layer under examination.

The overlap factor is a weighting factor based upon the overlap or intersection between one layer and the next. In some embodiment, this weighting factor is based upon the overlap area between adjacent layers.

The ILT weighting factor relates to the interlayer thickness between two layers. The layer factor is a weighting factor that is based upon the type and configuration of layers in the design. The side wall is a capacitance calculation factor based upon sidewall effects to nearby shapes. The sidewall factor determine the capacitance not just along a parallel run, but also the effects around a fringe from a parallel side.

Figure 6:
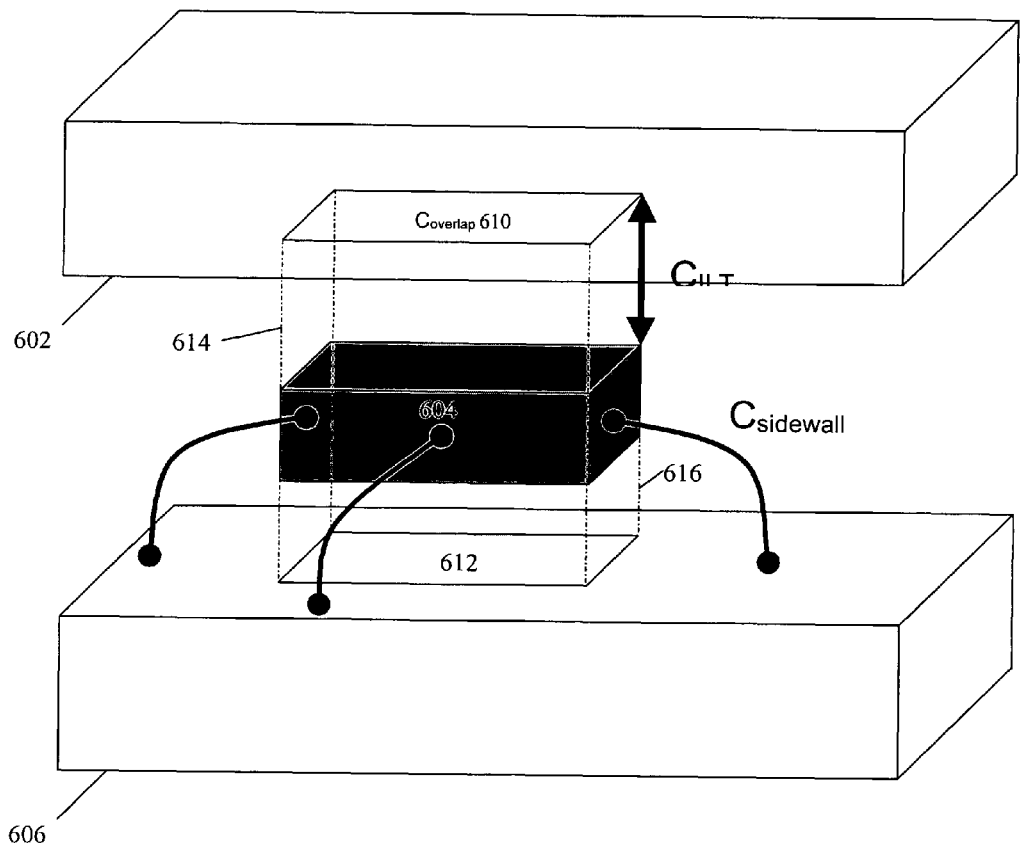
FIG. 6 illustrate cost and weighting factors for interlayer costs according to some embodiments of the invention.

FIG. 6 illustrates these weighting factors on an example layout. The example layout includes a metal fill shape 604, an object 602 in an adjacent upper layer, and an object 606 in a lower adjacent layer.

The $C_{overlap}$ factor is based upon the overlap in area between the metal fill object 604 to the objects in the adjacent layers. Thus, $C_{overlap}$ is based upon the overlap area 610 between the upper layer object 602 and the metal fill object 604 as well as the overlap area 612 between the lower layer object 606 and the metal fill object 604.

The $C_{ILT}$ factor is based upon the inter layer thickness parameters between the metal fill object 604 and the objects on adjacent layers. Here, the $C_{ILT}$ value is based upon the thickness parameter 614 between the metal fill object 604 and adjacent upper layer object 602, as well as the thickness parameter 616 between the metal fill object 604 and adjacent lower layer object 606.

The $C_{sidewall}$ factor is based upon the sidewall effects between the metal fill shape 504 and geometries on adjacent layers. Thus, $C_{sidewall}$ is based upon the sidewall effects between the metal fill object 604 and upper layer object 602 and lower layer object 606. The $C_{layer}$ factor is based the type and configuration of layers corresponding to the objects being analyzed. The chart 620 identifies example weighting factors that may be used for $C_{layer}$ in some embodiments of the invention. As shown, the $C_{layer}$ weight factor for Layer 1 is 10, Layer 2 is 9, Layer n is 7, etc. The weights for this type of interlayer analysis are for layer L+1 or L−1 relative to the layer being checked. This would allow for different ILTs between L and L+1 and L−1.

In the present approach, timing cost is used to select the metal fill shapes for insertion. The timing costs could be based upon factors associated with only a single layer, as illustrated in FIG. 5. The timing costs could be based upon only interlayer factors, as illustrated in FIG. 6. Three dimensional analysis can be performed, in which both interlayer and intralayer costs are assessed to determine the overall timing cost of candidate metal fill shapes.

In one embodiment, test wafers and test chip structures may be used to model and characterize the effects and cost values to use for both interlayer and intralayer costs. Electrical models are often used in the process of determining and predicting the electrical characteristics of an integrated circuit design. In the present invention, a test chip may be used to model the electrical behavior and interactions of structures on an integrated circuit. The test chip structures will include two dimensional configurations of structures (intralayer) as well as three dimensional configuration of structures (interlayer) so that realistic values may be used to calculate the cost of a given metal fill shape. Array of object structures, with varying sizes, shapes, configurations, and types, may be placed the test chip and on different layers of the test chip. The electrical performance of the test chip is measured to form the underlying data for the models. The models are then used to verify, model, and predict the electrical behavior of a given configuration for metal fill.

Figure 7A:
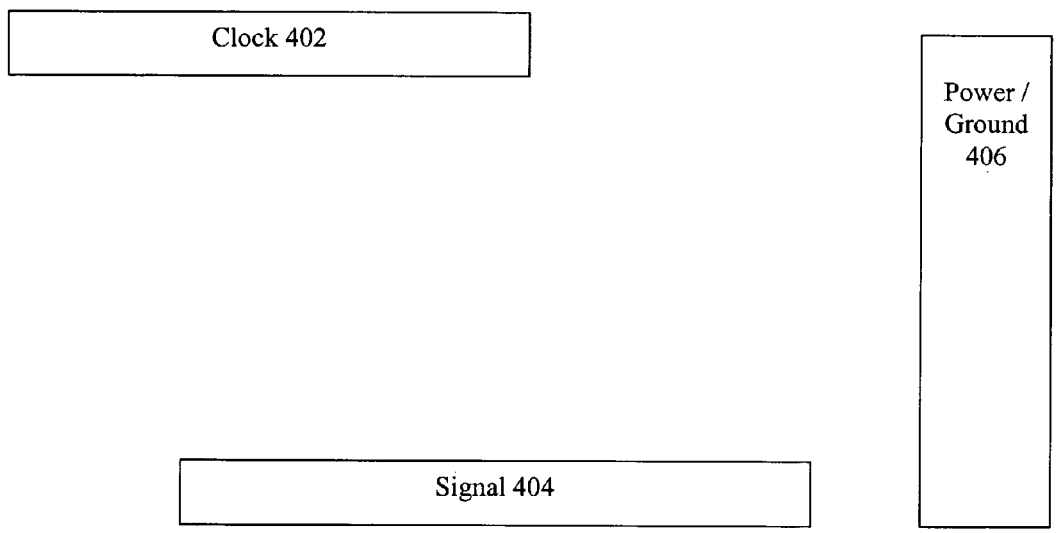

FIGS. 7A-7J illustrates an application of the inventive process to an example layout portion. The layout of FIG. 7A shows three existing geometries 402, 404, and 406. Assume that geometry 402 is a clock net object, geometry 404 is a signal net object, and that geometry 406 is part of a power or ground net.

Figure 7B:
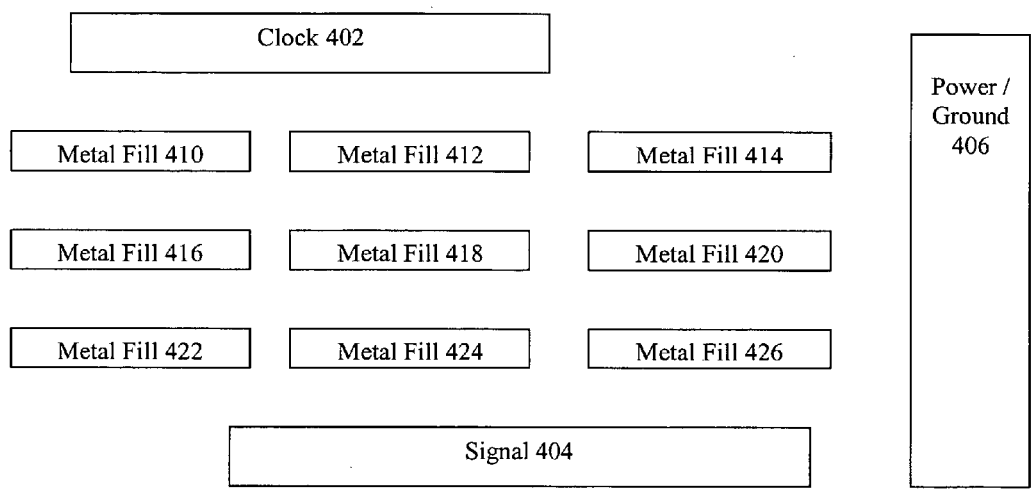

The initial action is to identify a set of candidate metal fill shapes. Referring to FIG. 7B, shown are candidate metal fill shapes 410, 412, 414, 416, 418, 420, 422, 424, and 426. An example approach for identifying an array of metal fill shapes that can fit within a given open space within an IC design is disclosed in co-pending U.S. application Ser. No. 10/300, 722, filed on Nov. 19, 2002, entitled "METHOD, SYSTEM AND ARTICLE OF MANUFACTURE FOR IMPLEMENTING METAL-FILL ON AN INTEGRATED CIRCUIT," which is hereby incorporated by reference in its entirety.

A cost value is associated with each candidate metal shape, e.g., as described in FIG. 5. Here, candidate shape 412 is near geometry 402 which is part of a clock net and there is also has a long parallel run between the two shapes. As such, candidate shape 412 is associated with a relatively large cost value (e.g., "42"). Candidate shape 410 is also very near clock net geometry 402 but has a slightly shorter parallel run between the two shapes. As such, candidate shape 410 is also associated with a relatively large cost value (e.g., "35"), but is slightly smaller than the cost value of candidate shape 412.

Candidate shape 426 is near geometry 404 which is part of a signal net and there is also has a long parallel run between the two shapes. Candidate shape 426 is also nearby and shares a parallel run within geometry 406, which is part of a power or ground net. As such, candidate shape 426 is associated with a cost value (e.g., "23") that is significantly lower than the costs values for shapes that are nearby the clock net geometry 402. Candidate shape 424 is also very near signal net geometry 404 with a long parallel run between the two shapes, but is not nearby power/ground net geometry 406. As such, candidate shape 424 also associated with a cost value of "20". Candidate shape 422 is also very near signal net geometry 404, but with only a very short parallel run between the two shapes. As such, candidate shape 422 is associated with a low cost value of "8".

Candidate shape 414 is very power/ground net geometry 406 with a short parallel run between the two shapes, and is somewhat close to clock ground net geometry 402. Therefore, based upon a presumed sidewall cost component, candidate shape 414 is associated with a cost value of "7".

Although candidate shape 420 is near power/ground geometry 406, the Weight$_{ObjectType}$ of power/ground shapes are such that the cost value of this candidate shape is zero. Since candidate metal fill shapes 416 and 418 are only nearby other metal fill shapes, the cost value of these shapes are also zero.

The candidate metal fill shapes are then sorted in lowest cost order as shown in FIG. 7C. The candidate shapes in order of lowest cost are 416, 418, 420, 414, 422, 424, 426, 410, and 412. When candidate metal fill shapes need to be inserted into the design, they are selected in the lowest-cost order as shown in FIG. 7C.

Referring to FIG. 7D, candidate shapes are then selected for insertion from lowest cost shape to the highest cost shape until the required density requirements are met. Initially, shape 416 is selected for insertion since it has the lowest cost. The density is checked after insertion to determine if the fill density meets the required density level. Assume that the density requirement is 40% and that after insertion of metal fill shape 416, the density reaches 30%. As such, the density requirements have not yet been met.

Figure 7E:
Figure 7E:
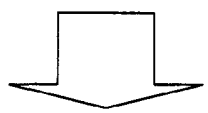

Therefore, another candidate shape is selected for insertion. Referring to FIG. 7E, candidate metal fill shape 418 is selected for insertion since, from the remaining candidate shapes, it is the candidate shape with the lowest cost value. The density is checked after insertion to determine if the fill density meets the required density level. Here, the density after insertion is only 32%, which is less than the required 40% density.

Figure 7F:

Referring to FIG. 7F, another candidate shape is selected for insertion. Shape 420 is selected for insertion since, from the remaining candidate shapes, it is the candidate shape with the lowest cost value. The density is checked after insertion to determine if the fill density meets the required density level. At this point, the density after insertion is only 34%, which is less than the required 40% density.

Figure 7G:
Figure 7G:

Referring to FIG. 7G, another candidate shape is selected for insertion. Shape 414 is selected for insertion. The density is checked after insertion to determine if the fill density meets the required density level. At this point, the density after insertion is only 36%, which is less than the required 40% density.

Figure 7H:
Figure 7H:

Referring to FIG. 7H, another candidate shape is selected for insertion. Shape 422 is selected for insertion. The density is checked after insertion to determine if the fill density meets the required density level. At this point, the density after insertion is only 38%, which is less than the required 40% density.

Figure 7I:

Referring to FIG. 7I, another candidate shape is selected for insertion. Shape 424 is selected for insertion. The density is checked after insertion to determine if the fill density meets the required density level.

At this point, the density has reached 40%, which has met the required 40% level. Therefore, the density requirements have been met. No further metal fill shapes need to be inserted and the metal fill insertion process ends.

Figure 7J:
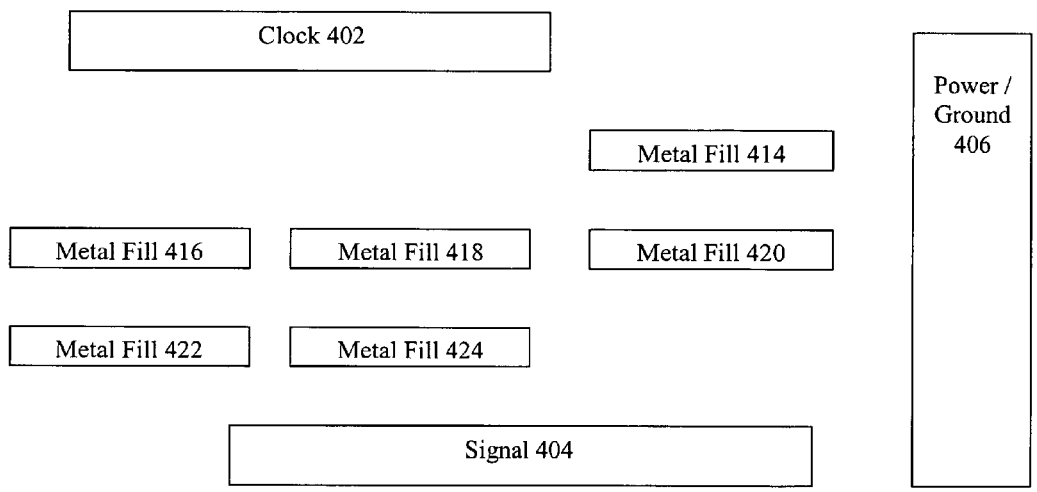

FIG. 7J shows the example layout with the selected metal fill shapes inserted. In particular, metal fill shapes 414, 416, 418, 420, 422, and 424 have been inserted into the design.

As can be seen, this process ensures that the lowest cost metal shapes are inserted into the design before the highest cost metal fill shapes, thus minimizing the possibility that the metal fill will negatively affect timing requirements. In this example, for instance, the high cost metal fill shapes 426, 410, and 412 are not even used, since density requirements had been achieved by using only lower cost metal fill shapes.

The described approach provides significant differentiation and advantages over the approach of setting larger distances between metal fill and existing geometries. The distance approach did not intelligently select the metal fill to insert, and thus could not target metal fill insert for low timing impact. By increasing the distance between shapes, density requirements may not be met, increasing the likelihood of numerous iterations to achieve the design goal. In addition, conventional metal fill tools apply uniform spacing rules with respect to all objects in the layout. Therefore, such conventional tools do not take into account the difference of whether the existing shape on the layout is, for example, a power or ground shape, a critical net or a non-critical net, a clock net shape.

System Architecture Overview

Figure 8:
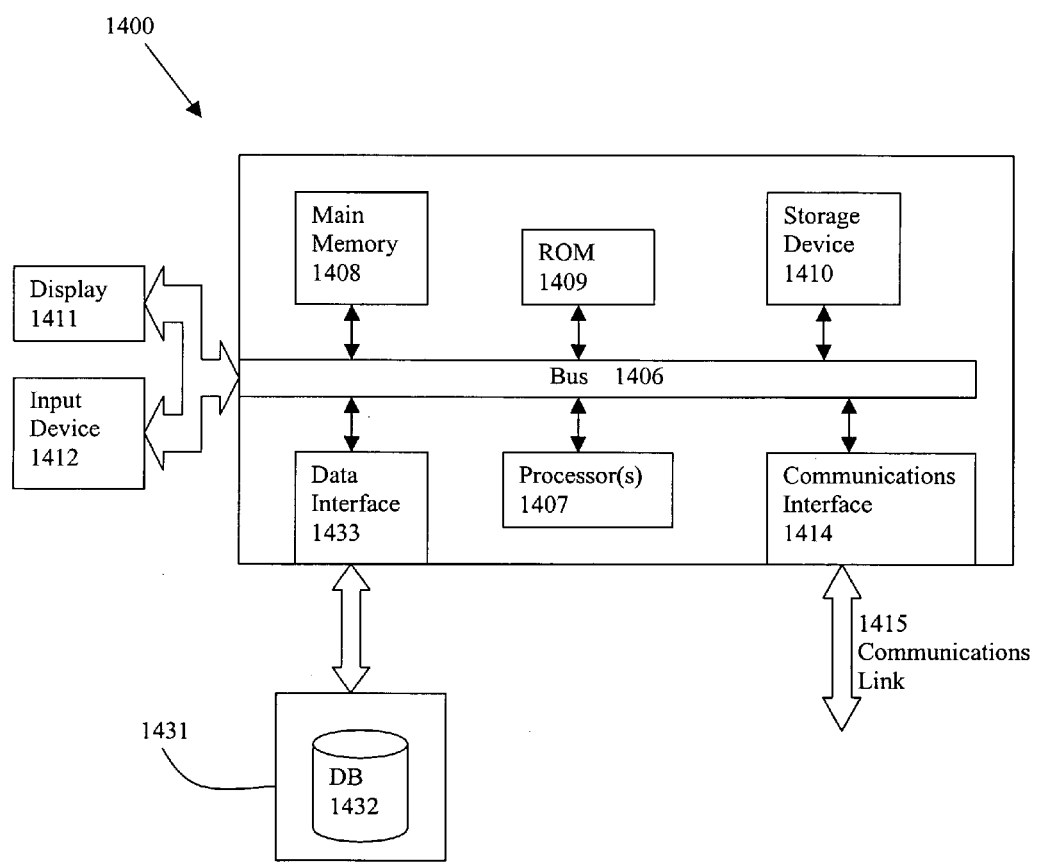
FIG. 8 illustrates an example computing architecture with which the invention may be implemented.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method for implementing metal fill on an integrated circuit design of an electronic circuit, comprising:
    using at least one computer system which comprises at least one processor and is programmed for performing:
    identifying a set of candidate metal fill shapes for insertion on a first layer in an integrated circuit design for which metal fill insertion to improve the integrated circuit design;
    assigning cost values to the set of candidate metal fill shapes, the cost values based at least in part upon expected timing impact to the integrated circuit design;
    implementing the integrated circuit design on the first layer for fabrication of the electronic circuit by performing:
        selecting and inserting one or more candidate metal fill shapes on the first layer from the set of candidate metal fill shapes, in which
            lower cost candidate metal fill shapes are selected for insertion prior to higher cost candidates, and
            existence of one or more existing metal fill geometries that already exist on the first layer is ignored during the act of implementing the integrated circuit design as if the one or more existing metal fill geometries were not existing in the integrated circuit design;
    performing metal fill repair.

2. The computer implemented method of claim 1 in which insertion is performed until density requirements are met for the integrated circuit design.

3. The computer implemented method of claim 1 in which metal fill is inserted with one pass of the metal fill insertion routine.

4. The computer implemented method of claim 1 further comprising:
    performing parasitic extraction and analysis; and
    determining whether the integrated circuit design exceeds minimum timing requirements.

5. The computer implemented method of claim 1 in which the metal fill repair is performed to correct one or more timing problems.

6. The computer implemented method of claim 1 in which an engineering change order (ECO) process is performed to implement metal fill repair.

7. The computer implemented method of claim 1 in which the metal fill repair comprises:
    incremental placement and routing in the integrated circuit design while ignoring metal fill geometries; and
    reconfiguring metal fill to correct design rule violations.

8. The computer implemented The method of claim 1 in which the cost values are based upon foundry specific parameters, timing analysis information, or user defined parameters.

9. The computer implemented method of claim 8 in which the user defined parameters comprise user defined critical net and path names, user defined layer cost, or user defined net weights.

10. The computer implemented method of claim 8 in which the foundry specific information comprises interlayer thickness, sheet capacitance, sheet resistance, layer thickness, layer cost, or net weight.

11. The computer implemented method of claim 8 in which the timing analysis information comprises critical net information regarding net path order, critical net information regarding path name, or timing slack.

12. The computer implemented method of claim 1 in which the cost values is based upon layout extraction information.

13. The computer implemented method of claim 1 in which the cost values are based upon intralayer costs.

14. The computer implemented method of claim 13 in which the intralayer costs are based upon a combination of some or all of distance value, parallel value, object weight value, and sidewall value.

15. The computer implemented method of claim 14 in which the object weight value comprises a weighting scale in which a clock net object is weighted heavier than a critical signal net object, which is weighted heavier than a non-critical signal net object, which is weighted heavier than a power/ground object, wherein a heavier weight will cause a greater timing cost effect.

16. The computer implemented method of claim 14 in which a greater distance value will cause a lower timing cost effect.

17. The computer implemented method of claim 14 in which a greater parallel value will cause a higher timing cost value.

18. The computer implemented method of claim 14 in which a greater sidewall value will cause a higher timing cost value.

19. The computer implemented method of claim 1 in which the cost values are based upon interlayer costs.

20. The computer implemented method of claim 19 in which the interlayer costs are based upon a combination of some or all of overlap value, interlayer thickness value, layer weight value, and sidewall value.

21. The computer implemented method of claim 20 in which a greater overlap value will cause a higher timing cost effect.

22. The computer implemented method of claim 20 in which a greater interlayer thickness value will cause a lower timing cost value.

23. The computer implemented method of claim 20 in which a greater sidewall value will cause a higher timing cost value.

24. The computer implemented method of claim 1 in which the cost value is based upon both interlayer costs and intralayer costs.

25. The computer implemented method of claim 1 in which the cost values are based upon whether a given net is critical or non-critical.

26. The computer implemented method of claim 1 which is performed within a place and route tool.

27. The computer implemented method of claim 1 in which timing costs values are used to determine the effect upon timing by the candidate metal fill shapes.

28. A computer implemented method for implementing metal fill on an integrated circuit design of an electronic circuit, comprising:
using at least one computer system which comprises at least one processor and is programmed for performing:
identifying an integrated circuit design for which metal fill insertion to improve the integrated circuit design;
implementing an a first layer of integrated circuit design for which metal fill insertion is to be performed, in which expected timing impacts of metal fill objects are used to identify specific metal fill shapes to insert into the first layer of the integrated circuit design wherein
existence of one or more existing fill geometries is ignored during the act of implementing the integrated circuit design as if the one or more existing metal fill geometries were not existing in the integrated circuit design, and a first metal fill candidate shape with lower expected timing impact is to be identified for insertion prior to a second metal fill candidate shape with a higher timing impact;
performing parasitic extraction and analysis to determine whether one or more timing requirements are met by the integrated circuit design; and;
performing metal fill repair.

29. The computer implemented method of claim 28 in which insertion is performed until density requirements are met for the integrated circuit design.

30. The computer implemented method of claim 28 in which the timing impacts are based upon foundry specific parameters, timing analysis information, user defined parameters, or layout extraction information.

31. The computer implemented method of claim 30 in which the foundry specific information comprises interlayer thickness, sheet capacitance, sheet resistance, layer thickness, layer cost, or net weight.

32. The computer implemented method of claim 31 in which the timing analysis information comprises critical net information regarding net path order, critical net information regarding path name, or timing slack.

33. The computer implemented method of claim 28 in which the timing impacts are based upon intralayer costs.

34. The computer implemented method of claim 33 in which the intralayer costs are based upon a combination of some or all of distance value, parallel value, object weight value, and sidewall value.

35. The computer implemented method of claim 34 in which the object weight value comprises a weighting scale in which a clock net object is weighted heavier than a critical signal net object, which is weighted heavier than a non-critical signal net object, which is weighted heavier than a power/ground object, wherein a heavier weight will cause a greater timing cost effect.

36. The computer implemented method of claim 28 in which the timing impacts are based upon interlayer costs.

37. The computer implemented method of claim 36 in which the interlayer costs are based upon a combination of some or all of overlap value, interlayer thickness value, layer weight value, and sidewall value.

38. The computer implemented method of claim 28 in which the cost value is based upon both interlayer costs and intralayer costs.

39. The computer implemented method of claim 28 in which the act of performing metal fill repair comprises:
incrementally placing and routing the integrated circuit design while ignoring the one or more existing metal fill geometries; and reconfiguring at least one of the one or more existing metal fill geometries or one or more second metal fill geometries to correct design rule violations.

40. A computer implemented method of implementing metal fill on an integrated circuit design of an electronic circuit, comprising:
    using at least one computer system which comprises at least one processor and is programmed for performing:
    implementing a test wafer having a configuration of physical test structures;
    recording electrical behavior of the physical test structures on the test wafer;
    modeling the electrical behavior to obtain expected timing costs for insertion of metal fill into the integrated circuit design; and
    implementing a first layer of the integrated circuit design for fabrication of the electronic circuit by performing at least:
        inserting one or more metal fill candidate fill shapes for the metal fill into the first layer of the integrated circuit design, wherein first metal fill candidate shape with a lower expected timing costs is selected for insertion prior to a second metal fill candidate shape with higher expected timing costs, and
        existence of one or more existing metal fill geometries that already exist on the first layer is ignored during the act of implementing the first layer of the integrated circuit design as if the one or more existing metal fill geometries were not existing in the integrated circuit design; and
        performing metal fill repair.

41. The computer implemented method of claim 40 in which the test wafer comprises interlayer physical structures to model interlayer electrical behavior.

42. The computer implemented method of claim 40 in which the act of performing metal fill repair comprises:
    incrementally placing and routing the integrated circuit design while ignoring the one or more existing metal fill geometries; and
    reconfiguring at least one of the one or more existing metal fill geometries or one or more second metal fill geometries to correct design rule violations.

43. A computer program product comprising non-transitory computer usable storage medium comprising a sequence of instructions which, when executed by a computer system, cause the computer system to execute a process for implementing metal fill on an integrated circuit design of an electronic circuit, the process comprising:
    using the computer system which comprises at least one processor and is programmed for performing:
    identifying a set of candidate metal fill shapes for insertion on a first layer in an integrated circuit design for which metal fill insertion to improve the integrated circuit design;
    assigning cost values to the set of candidate metal fill shapes, the cost values based at least in part upon expected timing impact to the integrated circuit design;
    implementing the integrated circuit design on the first layer for fabrication of the electronic circuit by performing at least:
        selecting and inserting one or more candidate metal fill shapes on the first layer from the set of candidate metal fill shapes, in which
            lower cost candidate metal fill shapes are selected for insertion prior to higher cost candidates, and
            existence of one or more existing fill geometries that already exist on the first layer is ignored during the act of implementing the integrated circuit design as if the one or more existing metal fill geometries were not existing in the integrated circuit design;
    performing metal fill repair.

44. The computer program product of claim 43, in which the process of performing the metal fill repair further comprises:
    incrementally placing and routing the integrated circuit design while ignoring the one or more existing metal fill geometries; and
    reconfiguring at least one of the one or more existing metal fill geometries or one or more second metal fill geometries to correct design rule violations.

45. A system for implementing metal fill on an integrated circuit design of an electronic circuit, comprising:
    at least one computer system which comprises at least one processor and is to:
    identify a set of candidate metal fill shapes for insertion on a first layer in an integrated circuit design for which metal fill insertion to improve the integrated circuit design;
    assign cost values to the set of candidate metal fill shapes, the cost values based at least in part upon expected timing impact to the integrated circuit design; and
    implement the integrated circuit design on the first layer for fabrication of the electronic circuit by using she at least one processor to at least: select and insert
        one or more candidate metal fill shapes on the first layer from the set of candidate metal fill shapes, in which
            lower cost candidate metal fill shapes are selected for insertion prior to higher cost candidates, and
            existence of one or more existing metal fill geometries that already exist on the first layer is ignored during the act of implementing the integrated circuit design as if the one or more existing metal fill geometries were not existing in the integrated circuit design; and
        perform metal fill repair.

46. The system of claim 45, in which the at least one computer system that is to perform the metal fill repair is further to:
    incrementally place and route the integrated circuit design while ignoring the one or more existing metal fill geometries; and
    reconfigure at least one of the one or more existing metal fill geometries or one or more second metal fill geometries to correct design rule violations.

47. A computer program product comprising non-transitory computer usable storage medium comprising a sequence of instructions which, when executed, cause a processor to execute a process for implementing metal fill on an integrated circuit design of an electronic circuit, the process comprising:
    using at least one computer system which comprises at least one processor and is programmed for performing:
    implementing a first layer of an integrated circuit design for which metal fill insertion is to be performed, in which
        expected timing impacts of metal fill objects are used to identify specific metal fill shapes to insert into the integrated circuit design,
        a first metal fill candidate shape with a lower expected timing impact is to be identified for insertion prior to a second metal fill candidate shape with a higher timing impact, and
        existence of one or more existing metal fill geometries that already exist on the first layer is ignored during the act of implementing the first layer of the integrated circuit design as if the one or more existing metal fill geometries were not existing in the integrated circuit design;

performing parasitic extraction and analysis to determine whether one or more timing requirements are met by the integrated circuit design; and performing metal fill repair.

48. The computer program product of claim 47, in which the process of performing the metal fill repair further comprises:

incrementally placing and routing the integrated circuit design while ignoring the one or more existing metal fill geometries; and reconfiguring at least one of the one or more existing metal fill geometries or one or more second metal fill geometries to correct design rule violations.

49. A system for implementing metal fill on an integrated circuit design of an electronic circuit, comprising:

at least one computer system which comprises at least one processor and is to:

implement a first layer of an integrated circuit design for which metal fill insertion is to be performed, in which expected timing impacts of metal fill objects are used to identify specific metal fill shapes to insert into the integrated circuit design, a first metal fill candidate shape with lower expected timing impact is to be identified for insertion prior to a second metal fill candidate shape with a higher timing impact, and existence of one or more existing metal fill geometries on the first layer is ignored during the act of implementing the first layer of the integrated circuit design as if the one or more existing metal fill geometries were not existing in the integrated circuit design;

perform parasitic extraction and analysis to determine whether one or more timing requirements are met by the integrated circuit design; and perform metal fill repair.

50. The system of claim 49, in which the at least one computer system that is to perform the metal fill repair is further to:

incrementally place and route the integrated circuit design while ignoring the one or more existing metal fill geometries; and reconfigure at least one of the one or more existing metal fill geometries or one or more second metal fill geometries to correct design rule violations.

51. A computer program product comprising non-transitory computer usable storage medium comprising a sequence of instructions that, when executed, cause a processor to execute a process for implementing metal fill on an integrated circuit design of an electronic circuit, the process comprising:

using at least one computer system which comprises at least one processor and is programmed for performing:

implementing a test wafer having a configuration of physical test structures;

recording electrical behavior of the physical test structures on the test wafer;

modeling the electrical behavior to obtain expected timing costs for insertion of metal fill into the integrated circuit design; and implementing a first layer of the integrated circuit design for fabrication of the electronic circuit by performing at least:

inserting one or more metal fill candidate fill shapes the metal fill into the first layer of the integrated circuit design, wherein a first metal fill candidate shape with lower expected timing costs is selected for insertion prior to a second metal fill candidate shape with higher expected timing costs, and existence of one or more existing metal fill geometries that already exist on the first layer is ignored during the act of implementing the first layer of the integrated circuit design as if the one or more existing metal fill geometries were not existing in the integrated circuit design; and performing metal fill repair.

52. The computer program product of claim 51, in which the process of performing the metal fill repair further comprises:

incrementally placing and routing the integrated circuit design while ignoring the one or more existing metal fill geometries; and reconfiguring at least one of the one or more existing metal fill geometries or one or more second metal fill geometries to correct design rule violations.

53. A system of implementing metal fill on an integrated circuit design of an electronic circuit, comprising:

at least one computer system which comprises at least one processor and is to:

implement a test wafer having a configuration of physical test structures;

record electrical behavior of the physical test structures on the test wafer;

model the electrical behavior to obtain expected timing costs for insertion of metal fill into the integrated circuit design; and implement a first layer of the integrated circuit design for fabrication of the electronic circuit by using the at least one processor at least to:

inserting one or more metal fill candidate shapes for the metal fill into the first layer of the integrated circuit design, wherein a first metal fill candidate shape with a lower expected timing costs is selected for insertion prior to a second metal fill candidate shape with a higher expected timing costs, and existence of one or more existing metal fill geometries that already exist on the first layer is ignored during the act of implementing the first layer of the integrated circuit design as if the one or more existing metal fill geometries were not existing in the integrated circuit design; and metal fill repair.

54. The system of claim 53, in which the at least one computer system to perform the metal fill repair is further to:

incrementally place and route the integrated circuit design while ignoring the one or more existing metal fill geometries; and reconfigure at least one of the one or more existing metal fill geometries or one or more second metal fill geometries to correct design rule violations.

* * * * *